United States Patent [19]
Guan

[11] Patent Number: 5,725,826
[45] Date of Patent: Mar. 10, 1998

[54] METHOD OF FABRICATING CERAMIC COOKING VESSEL

[76] Inventor: Goh Kim Guan, 8F-6, No. 100, Hoping E. Rd., Sec. 2, Taipei, Taiwan

[21] Appl. No.: 650,091

[22] Filed: May 17, 1996

[51] Int. Cl.$^6$ ....................................... C04B 33/32
[52] U.S. Cl. .......................... 264/600; 264/602; 264/618; 264/619; 264/633; 264/671
[58] Field of Search ..................... 264/600, 602, 264/607, 618, 619, 633, 671, 673

[56] References Cited

U.S. PATENT DOCUMENTS

| | | | |
|---|---|---|---|
| 1,400,489 | 12/1921 | Lowry | 264/602 |
| 1,814,870 | 7/1931 | Tycer | 264/602 |
| 2,788,561 | 4/1957 | Mueller | 264/600 |
| 4,208,836 | 6/1980 | Kramer | 264/602 |
| 4,399,089 | 8/1983 | Mohri et al. | 264/602 |

*Primary Examiner*—Christopher A. Fiorilla
*Attorney, Agent, or Firm*—Morton J. Rosenberg; David I. Klein; Jon Y. Lee

[57] ABSTRACT

The ceramic cooking container fabricating method of the invention includes the steps of: (a) material preparation to prepare material from clay; (b) shape pressing to prepare a green cooking container and a green annular supporting cushion from the material thus obtained and to cover the green cooking container with a layer of glaze; and (c) firing to make an annular groove on the bottom side of the green cooking container, then to put the green annular supporting cushion and the green cooking container on the silicon carbide plate in a kiln, permitting the annular groove of the green cooking container to be supported on the green annular cushion, and then to fire the green cooking container and the green annular supporting cushion at about 135° C. for a predetermined length of time, and then to fasten electrically conductive annular membranes to the bottom side of the cooking container so as to obtain a finished ceramic cooking container.

9 Claims, 8 Drawing Sheets

METHOD OF FABRICATING CERAMIC COOKING VESSEL

BACKGROUND OF THE INVENTION

The present invention relates to the fabrication of a cooking container, and relates more particularly to the method of fabricating a ceramic cooking container adapted for use with an electric ceramic heater. The present invention relates also to the ceramic cooking container thus fabricated.

A variety of ceramic cooking containers have been intensively used for holding and cooking foods. However, conventional ceramic cooking containers cannot be used with an electric ceramic heater. When fabricating a ceramic cooking container, an annular flange must be made at the bottom side of the green cooking container before firing so that the ceramic cooking container does not stick to the silicon carbide plate in the kiln after firing. To make a ceramic cooking container applicable for use with an electric ceramic heater, an electrically conductive membrane must be installed in the bottom side of the ceramic cooking container. However, because of the existence of the annular flange, it is not practical to fasten an electrically conductive membrane to the bottom side of a ceramic cooking container.

SUMMARY OF THE INVENTION

The present invention has been accomplished under the circumstances in view. It is one object of the present invention to provide a ceramic cooking container which is adapted for use with an electric ceramic heater. It is another object of the present invention to provide a ceramic cooking container fabricating method which is practical for the fabrication of ceramic cooking containers adapted for use with an electric ceramic heater. According to the present invention, the ceramic cooking container fabricating method includes the steps of: (a) material preparation to prepare material from clay; (b) shape pressing to prepare a green cooking container and a green annular supporting cushion from the material thus obtained and to cover the green cooking container with a layer of glaze; and (c) firing to make an annular groove on the bottom side of the green cooking container, then to put the green annular supporting cushion and the green cooking container on the silicon carbide plate in a kiln, permitting the annular groove of the green cooking container to be supported on the green annular cushion, and then to fire the green cooking container and the green annular supporting cushion at about 135° C. for a predetermined length of time, and then to fasten electrically conductive annular membranes to the bottom side of the cooking container so as to obtain a finished ceramic cooking container.

DETAILED DESCRIPTION OF THE PREFERRED EMBODIMENT

Figure 1:
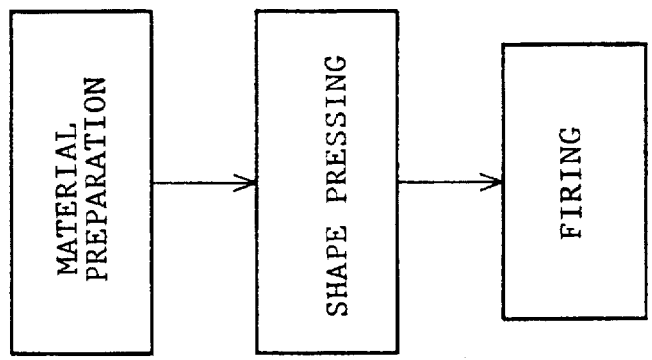
FIG. 1 is a fabrication flow chart of the ceramic cooking container fabricating method of the present invention.

Referring to FIG. 1, the fabrication method of a cooking container for use with an electric ceramic heater in accordance with the present invention includes the steps of (a) material preparation, (b) shape pressing, and (c) firing.

Figure 2:
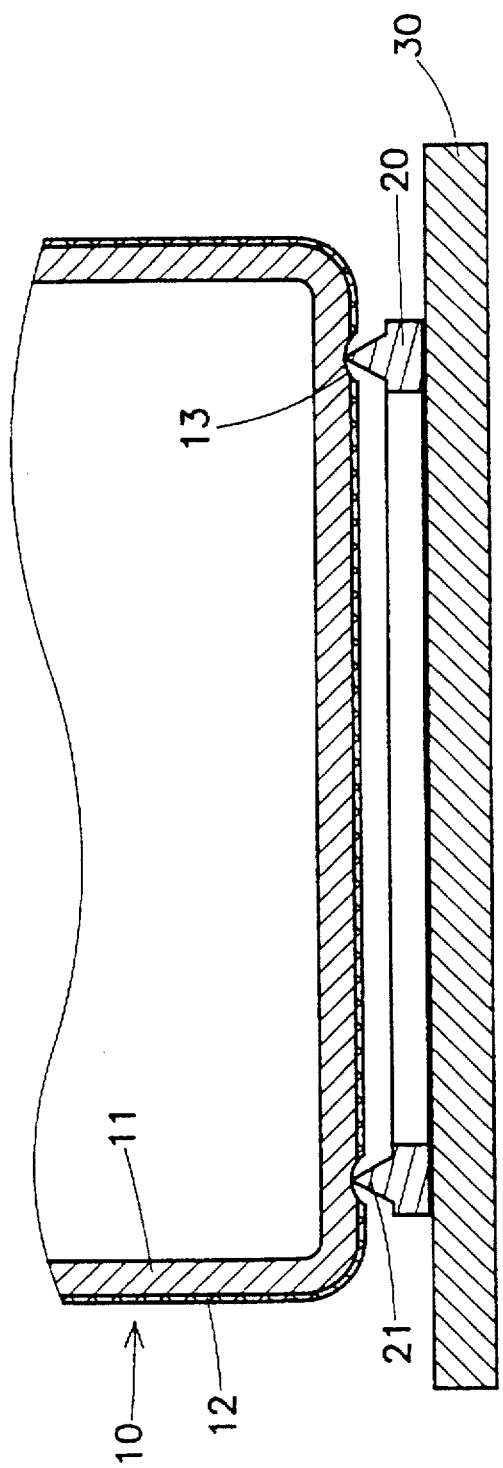
FIG. 2 is a sectional side view showing the green cooking container supported on the annular supporting cushion above the silicon carbide plate according to the present invention.
Figure 3:
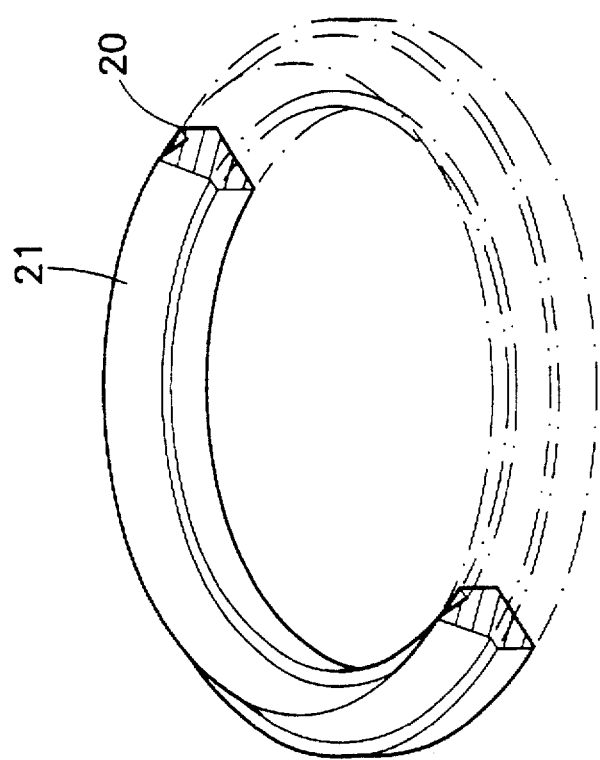
FIG. 3 shows the structure of the annular supporting cushion according to the present invention.

Referring to FIGS. from 2 to 7 and FIG. 1 again, the aforesaid processing step of material preparation is to prepare material from clay through a series of procedures including grinding, screening, impurity removing, etc. This processing step of material preparation is similar to conventional methods, therefore it is not described in detail. The aforesaid step of shape pressing is to prepare a green ware of cooking container 10 and a green ware of supporting device for example a green annular cushion 20 from the material thus obtained from the processing step of material preparation. The preparation of the green ware of cooking container 10 is achieved through a series of procedures including shape pressing, drying, lug attaching, polishing, moistening, glazing, bore drilling, etc. The process of the preparation of the green ware of cooking container 10 is similar to the conventional methods in preparing a green ware, therefore it is not described in detail. The green cooking container 10 has a layer of glaze 12 covered over the outside wall of the body 11 thereof. The green annular cushion 20 has an upward flange of pyramidal cross section 21 raised around the top side thereof (see FIG. 3). The aforesaid processing step of firing is to make at least one recessed portion for example an annular groove 13 on the bottom side of the green cooking container 10 to fit the upward flange of pyramidal cross section 21 of the green annular cushion 20, then to put the green annular cushion 20 and the green cooking container 10 on the silicon carbide plate in a kiln, permitting the green cooking container 10 to be supported on the green annular cushion 20 with the upward flange pyramidal cross section 21 of the green annular cushion 20 fitted into the annular groove 13 of the green cooking container 10 (see FIG. 2), and then to gradually heat up to about 135° C. within about 3–3.5 hours and to keep heating at about 135° C. for about one one hour and a half. Because the annular groove 13 of the green cooking container 10 and the green annular cushion 20 are not glazed (the layer of glaze at the annular groove 13 is removed when the annular groove 13 is formed), the cooking container 10 does not stick to the annular cushion 20 and the bottom side of the cooking container 10 is maintained flat after firing. After firing, electrically conductive annular membranes 40 are concentrically fastened to the bottom side of the cooking container 10 through a transfer printing process (see FIGS. 4 and 5), and then the cooking container 10 is put in a drying oven and heated at the heating temperature of about 850° C. for about 10–15 minutes. After drying, a finished cooking container is thus achieved.

Figure 6:
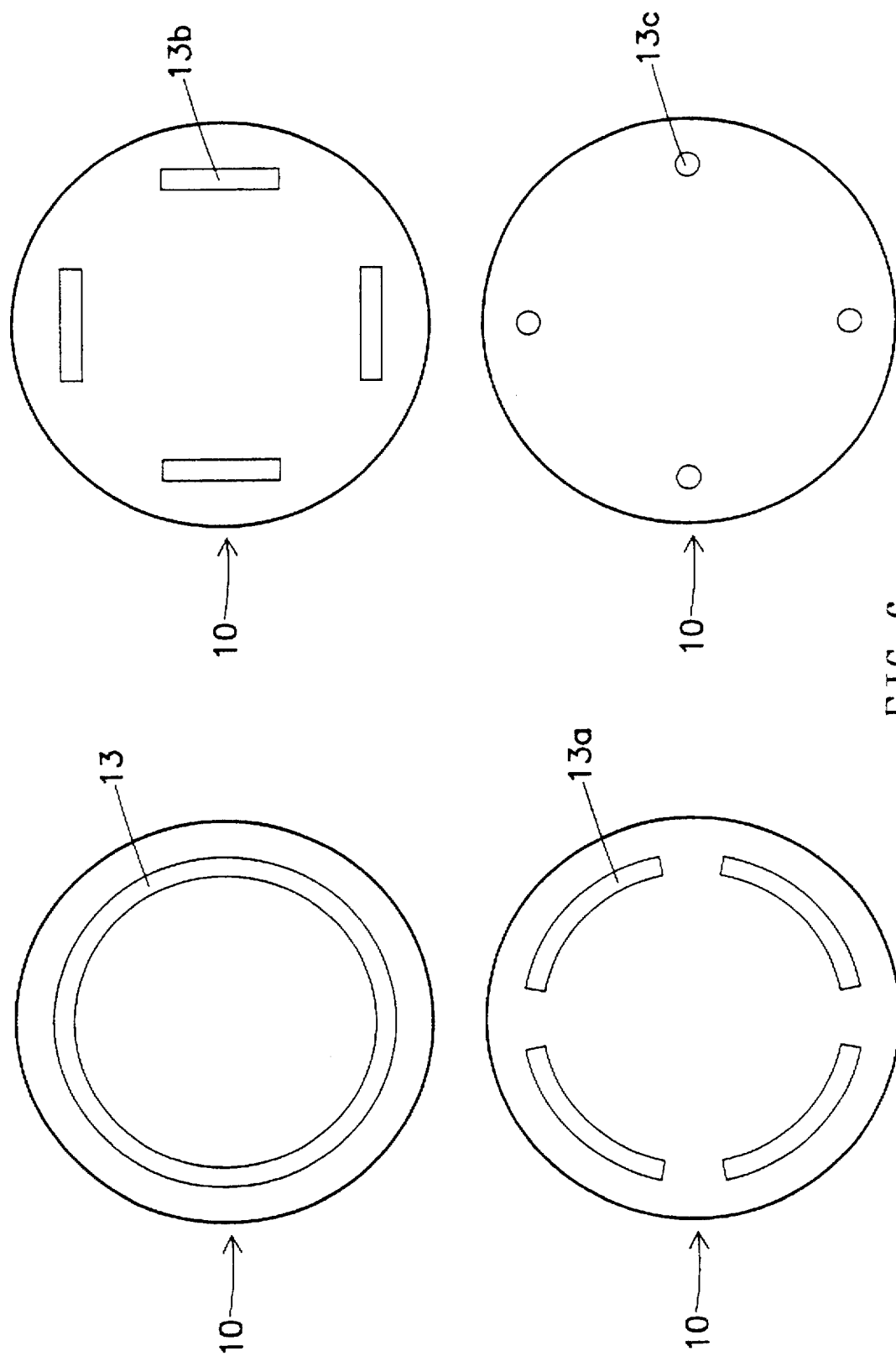
FIG. 6 shows different forms of the at least one recessed portion of the cooking container according to the present invention.
Figure 7:
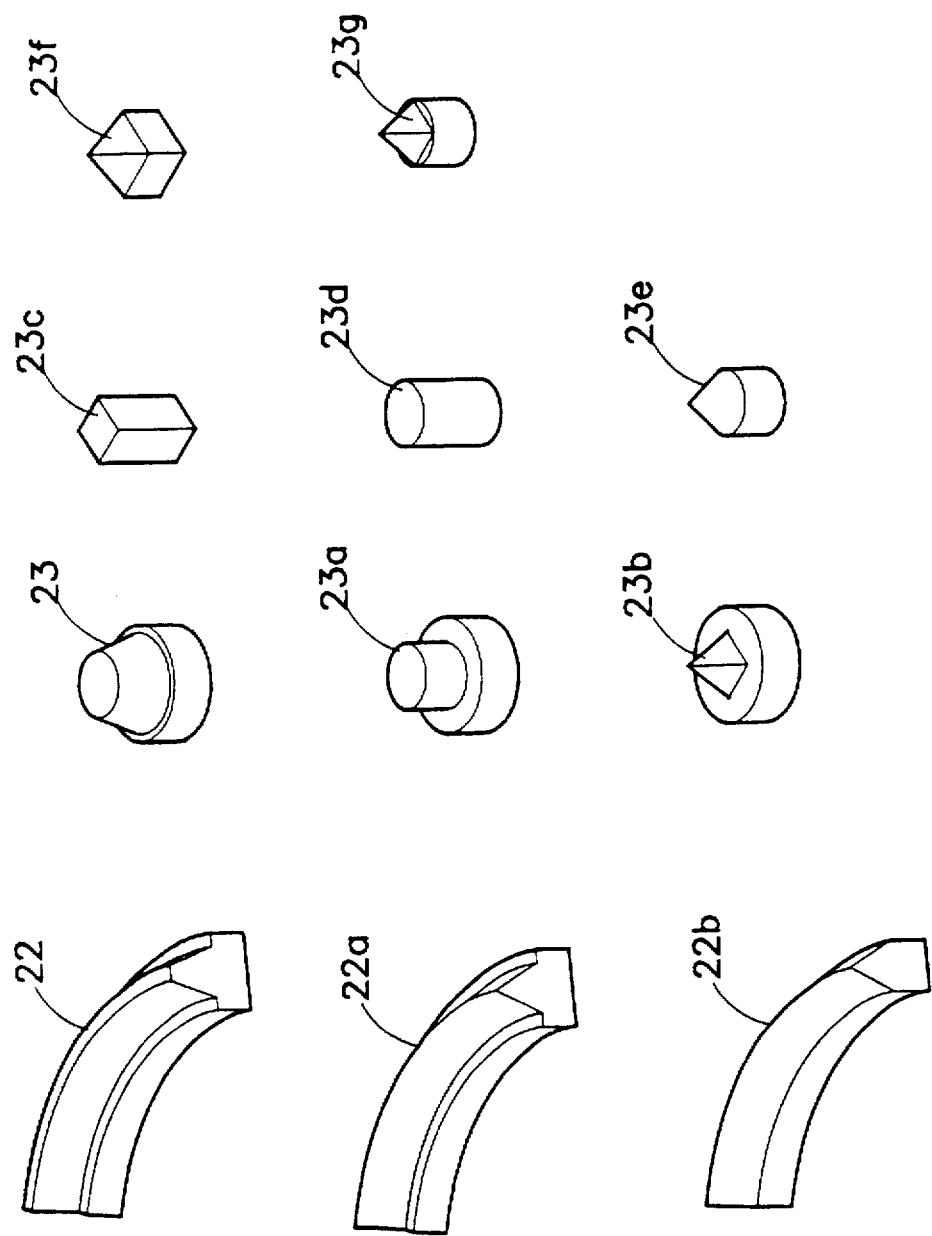
FIG. 7 shows different forms of the green ware of supporting device according to the present invention.

Referring to FIGS. 6 and 7, the aforesaid supporting device may be made in any of a variety of forms shown in FIG. 7, and the at least one recessed portion of the aforesaid cooking container may be made in any of the variety of forms shown in FIG. 6 subject to the form of the supporting device used.

Figure 8:
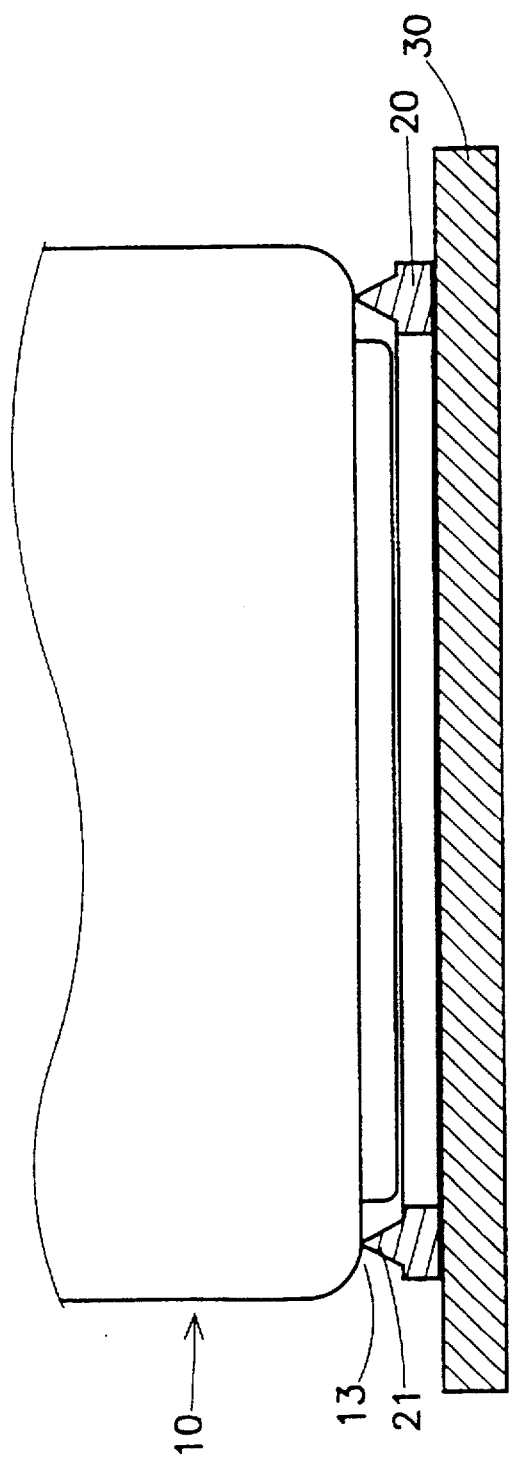
FIG. 8 is a sectional side view of an alternate form of the present invention, showing the green cooking container supported on the annular supporting cushion above the silicon carbide plate.

Referring to FIG. 8, the aforesaid annular groove 13 may be made on the bottom side of the cooking container 10 around the border.

Figure 4:
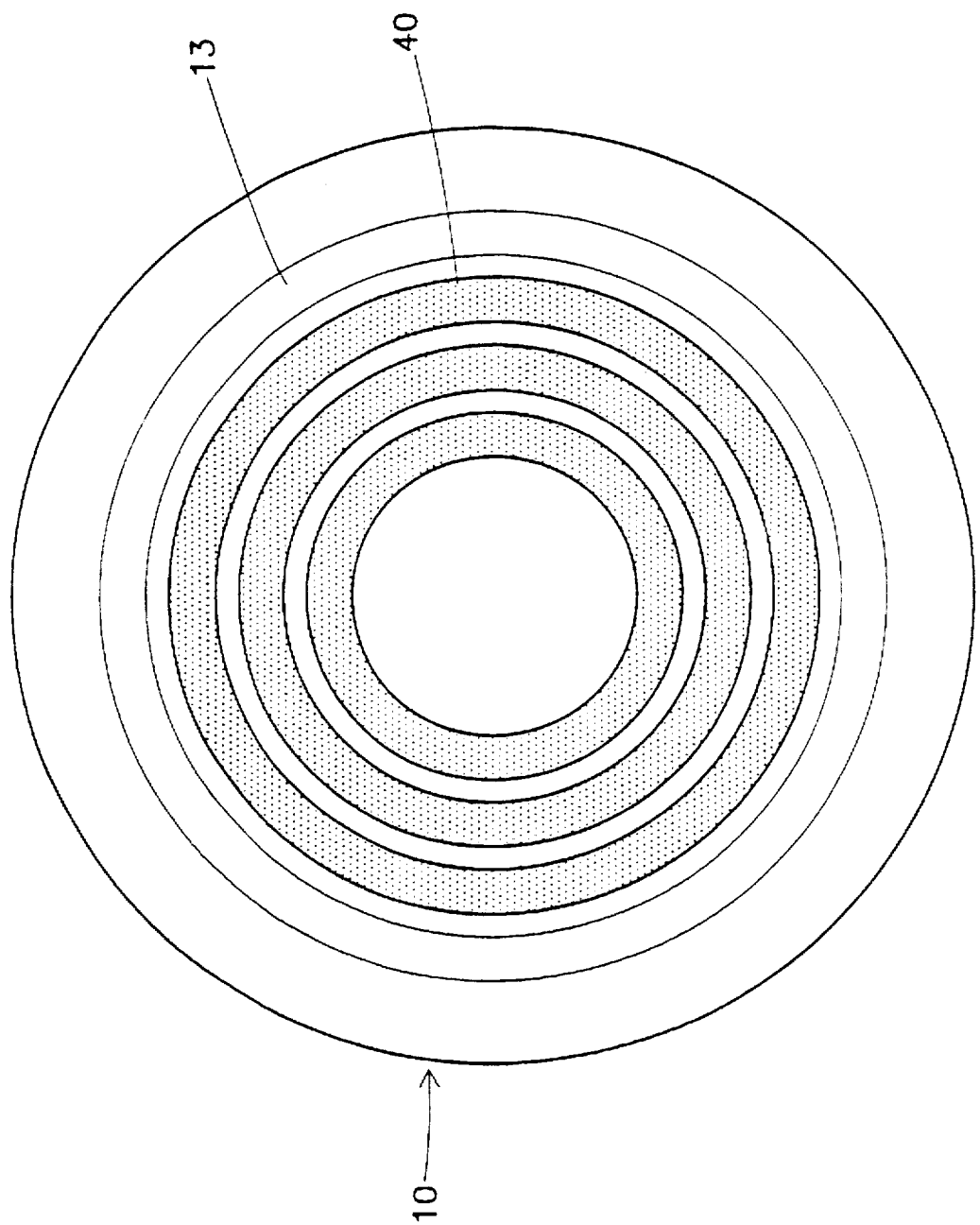
FIG. 4 is a bottom view of a ceramic cooking container according to the present invention.
Figure 5:
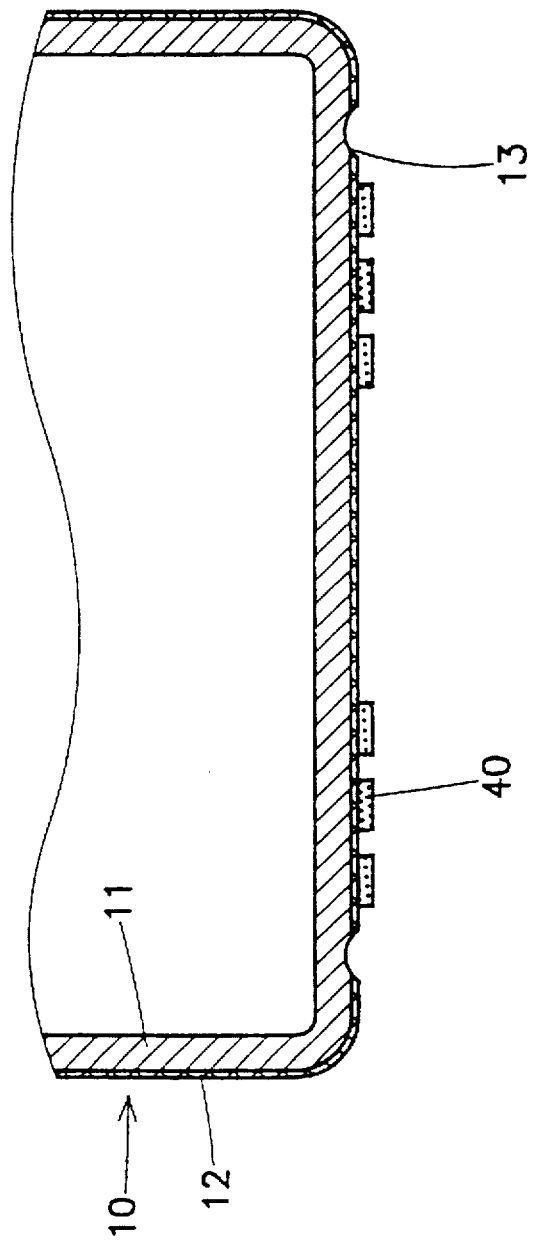
FIG. 5 is a sectional side view of a ceramic cooking container according to the present invention.

Referring to FIGS. 4 and 5, the finished cooking container 10 has an annular groove 13 on the flat bottom side thereof, and electrically conductive annular membranes 40 concentrically disposed on the flat bottom side within the annular groove 13.

It is to be understood that the drawings are designed for purposes of illustration only, and are not intended as a definition of the limits and scope of the invention disclosed.

What the invention claimed is:

1. A method of fabricating a ceramic cooking vessel for use with a heating device comprising the steps of:

(a) preparing a clay material to adapt said clay material for shape pressing and firing;

(b) forming from said clay material a greenware vessel and a greenware support member, said greenware vessel including an outer bottom surface having formed therein at least one recessed portion, said outer bottom surface of said greenware vessel being substantially coated, except at said recessed portion, with a glaze layer, said greenware support member including a base portion and a raised portion protruding therefrom;

(c) placing said greenware vessel and said greenware support member into a kiln having a support surface, said base portion of said greenware support member being supported on said kiln support surface, said greenware vessel being supported on said greenware support member by supporting engagement of said recessed portion thereof with said raised portion of said greenware support member;

(d) firing said greenware vessel and said greenware support member within said kiln at a temperature approximating 135 degrees Celsius for a time period sufficient to transform said greenware vessel to a pre-dried vessel having a bottom face;

(e) fastening onto said bottom face of said pre-dried vessel at least one electrically conductive membrane; and, (f) drying said pre-dried vessel in a drying oven to form said ceramic cooking vessel having a bottom heating surface.

2. The method of fabricating a ceramic cooking vessel as recited in claim 1 wherein said support surface of said kiln is formed of a silicon carbide material.

3. The method of fabricating a ceramic cooking vessel as recited in claim 1 wherein said bottom heating surface of said ceramic cooking vessel is formed with a substantially flat contour.

4. The method of fabricating a ceramic cooking vessel as recited in claim 1 wherein said raised portion of said greenware support member is formed as an annular flange having a substantially conical cross-sectional contour.

5. The method of fabricating a ceramic cooking vessel as recited in claim 1 wherein said recessed portion in said outer bottom surface of said greenware vessel is formed as an annular groove.

6. The method of fabricating a ceramic cooking vessel as recited in claim 1 wherein a plurality of said electrically conductive membranes are fastened onto said bottom face of said pre-dried vessel.

7. The method of fabricating a ceramic cooking vessel as recited in claim 6 wherein said electrically conductive membranes are each annular in shape and disposed in concentric manner.

8. The method of fabricating a ceramic cooking vessel as recited in claim 7 wherein said bottom heating surface of said ceramic cooking vessel is formed with an annular groove encircling said electrically conductive membranes.

9. The method of fabricating a ceramic cooking vessel as recited in claim 1 wherein said electrically conductive membrane is fastened to said bottom face of said pre-dried vessel through a transfer printing process.

* * * * *